United States Patent [19]
Krӕmer et al.

[11] Patent Number: 6,143,051
[45] Date of Patent: Nov. 7, 2000

[54] FRICTION MATERIAL, METHOD OF PREPARING SAME AND FRICTION LINING

[75] Inventors: Ole Krӕmer, Hillerød; Niels Bramsø, Gentofte; Erik Simonsen, Odense M; Noel De Leon, Odense C; Knud Strande, Taastrup, all of Denmark; Rolf Törnberg; Claes Kuylenstierna, both of Göteborg, Sweden

[73] Assignees: A/S Roulunds Fabriker, Odense S, Denmark; Volvo Truck Corporation, Göteborg, Sweden

[21] Appl. No.: 09/254,653

[22] PCT Filed: Sep. 17, 1997

[86] PCT No.: PCT/DK97/00391

§ 371 Date: May 20, 1999

§ 102(e) Date: May 20, 1999

[87] PCT Pub. No.: WO98/12448

PCT Pub. Date: Mar. 26, 1998

[30] Foreign Application Priority Data

Sep. 17, 1996 [DK] Denmark ................................ 1012/96

[51] Int. Cl.⁷ ...................................................... B22F 3/00
[52] U.S. Cl. ............................... 75/229; 75/230; 75/246; 419/24; 419/38
[58] Field of Search ............................ 75/229, 243, 246; 419/24, 38

[56] References Cited

U.S. PATENT DOCUMENTS

| | | | |
|---|---|---|---|
| 3,835,118 | 9/1974 | Rhee et al. ................................. | 260/38 |
| 4,415,363 | 11/1983 | Sanftleben et al. ........................ | 75/229 |
| 5,096,661 | 3/1992 | Lang ............................................ | 419/2 |
| 5,266,395 | 11/1993 | Yamashita et al. ....................... | 428/292 |
| 5,501,728 | 3/1996 | Shepley et al. ............................ | 106/36 |

OTHER PUBLICATIONS

EPODOC/EPO, CN1079973 A 19931229, "Drilling Rig Skate Brake–Block . . . Method" of Yimeng Braking Material Factory (CN).

EPODOC/EPO, CN1110286 A 19951018, "High Temp. Resistance Non–Asbestos Friction Material" of Liu Junya (CN).

*Primary Examiner*—Ngoclan Mai
*Attorney, Agent, or Firm*—Dykema Gossett PLLC

[57] ABSTRACT

A friction material comprising a sintered mass of iron in which graphite particles are dispersed, which sintered mass is formed from between 13 and 22 vol. % of iron fibers, between 13 and 22 vol. % of iron particles having a particle size of 10–400 μm, between 40 and 70 vol. % of graphite particles having a particle size of 25–3000 μm, and between 10 and 15 vol. % of a metallic binder having a melting point of 800–1140° C., and a method of preparing such a friction material, wherein a mixture of these components is compressed at a pressure of at least 100 MPa so as to form a compact having a desired form and size, and where the compact thus formed is sintered at a temperature between 800 and 1140° C. for a period of time which is sufficiently long for achieving concretion of iron fibers, iron particles and metallic binder.

17 Claims, No Drawings

FRICTION MATERIAL, METHOD OF PREPARING SAME AND FRICTION LINING

The present invention relates to a friction material and in particular a brake lining material comprising a sintered mass of iron in which graphite particles are dispersed.

A number of commercially available brake lining materials comprise particles, such as iron particles and graphite particles, bonded together by an organic binder, such as a phenol-formaldehyde resin.

If brake linings consisting of such a material are exposed to severe energy loads and consequently high temperatures, such as temperatures of the order of 700° C., which e.g. arise when they are used in brakes for trucks, a decomposition of the organic binder occurs under formation of gaseous decomposition products. Hereby the useful life of the brake linings is reduced.

Metal bonded brake lining materials are also known, viz. materials comprising a sintered iron matrix containing comparatively small amounts of dispersed graphite particles. These known metal bonded lining materials suffer from the disadvantage that at severe energy loads melting may occur of parts of the iron matrix, whereby an incipient welding together of the brake pads and the. brake drum or the brake disc occurs.

It is known to use brake linings which essentially consist of graphite ill brakes for Formula I racers. Such brakes are very efficient, but they are worn down very rapidly and normally only last one race.

It has been attempted to prepare metal bonded brake lining materials having a large content of graphite particles, but these attempts have run up against the difficulty that increasing content of graphite particles in the iron matrix entails decreasing strength and consequently reduced wear resistance.

EP 0 093 673 discloses a friction material comprising a major amount (72–85 weight-%) of iron powder, graphite (3–14 weight-%), coke (2–12 weight-%), low melting material (3–10 weight-%), such as tin, and a friction modifying agent (up to 3 weight-%), some of the iron powder being optionally replaced with iron fibres.

It is the object of the present invention to provide a friction material having haigher wear resistance than the friction material according to EP 0 093 673.

The friction material according to the invention is characterized in that the sintered mass comprises from between 13 and 22 vol.-% of iron fibres, between 13 and 22 vol.-% of iron particles having a particle size of 10–400 $\mu$m, between 40 and 70 vol.-% of graphite particles having a particle size of 25–3000 $\mu$m, and between 10 and 15 vol.-%, of a metallic binder having a melting point of 800–1140° C.

The invention is based on the discovery that by using comparatively large graphite particles, the graphite particles normally used in metallurgical processes typically have a particle size of 0.1–10 $\mu$m, and a metallic binder having a melting point within the temperature range ill which the sinterinig takes place, a strong and stable iron framework is formed in which the graphite particles are embedded, and from where they can be released under the influence of friction and form a film between brake pad and brake drum or brake disc.

The iron fibres, the iron particles and the metallic binder are thus the sintering active and consequently strength imparting components, while the graphite particles are the friction controlling components of the sintering mass.

The iron fibres present in the friction material are preferably steel fibres, i.e. fibres of an iron alloy having a carbon content of up to 2%;. The iron fibres preferably have a length between 0.5 and 5 mm and a thickness within the range 10–100 $\mu$m.

As mentioned, the iron particles have a particle size from 10 to 400 $\mu$m, and preferably a particle size from 20 to 200 $\mu$m.

As mentioned, the graphite particles have a particle size from 25 to 3000 $\mu$m, and preferably a particle size from 90 to 1000 $\mu$M.

As metallic binder, preferably a metallic material selected from Cu, Sn and Zn is used.

Bronze in powder form and of a type in which the content of copper is from 85 to 99%, and the content of tin is from 1 to 15%, is particularly useful.

The friction material according to the invention may in addition to the components mentioned above contain from 0.1 to 15 vol.-% of additional components, such as $Al_2O_3$, FeSi, $Fe_3Si_2$, $FeSi_2$, $Fe_2Si_5$, $MgCO_3$, $SiO_2$, BN, $Ca_3(PO_4)_2$, $BaSO_4$, $Fe_2O_3$, $CuAl_2$, Si, Al, Cu, P, and suiphides of Mo, Mn, Sb, Cu, Sn and W.

Admixing of a ceramic material into the sintered mass causes a stabilization of the friction at fluctuating temperatures. A particularly good stabilization is obtained by using a ceramic material having two different grain sizes.

A particularly preferred additive is $Al_2O_3$, which serves to increase the friction coefficient and keep the friction coefficient constant.

The present invention further relates to a method of preparing a friction material, which method is characterized in that a mixture comprising 13–22 vol.-% iron fibres, 13–22 vol.-% of iron particles having a particle size between 10 and 400 $\mu$m, 40–70 vol.-% of graphite particles having a particle size between 25 and 3000 $\mu$m, and 10–15 vol.-% of metallic binder is compressed at a pressure of at least 100 MPa so as to form a compact having a desired form and size, and that the compact formed is sintered at a temperature between 800 and 1140° C. for a sufficiently long period of time to achieve concretion of iron fibres, iron particles and metallic binder.

Optionally, iron fibres, iron particles and metallic binder can be mixed prior to these components being mixed with the graphite particles.

When $Al_2O_3$ is to form part of the mixture of starting materials, it is preferred to disperse $Al_2O_3$ in water and to mix the dispersion thus formed with the graphite particles, and to remove the water from the mixture prior to it being mixed with the other components.

The mixture of graphite particles and $Al_2O_3$ may expediently be added with a minor amount, e.g. 1–3 weighit-%, of an oil, such as a vegetable oil, prior to the mixing with the other components.

In the following the invention is described in more detail with reference to the example below.

EXAMPLE 22 cm$^3$ of iron fibres, 22 cm$^3$ of iron particles having an average particle size of 100 $\mu$m, and 15 cm$^3$ of bronze powder having a melting point of 1040° C. were mixed in a V-mixer with internal rotor for about 10 min.

1 cm$^3$ of $Al_2O_3$ particles were added to 100 cm$^3$ of water, and the mixture thus formed was subjected to an ultrasonic treatment so as to form a homogeneous dispersion. The dispersion was mixed with 40 cm$^3$ of graphite particles having an average particle size of 300 $\mu$m, following which the water was removed by evaporation in an oven.

The mixture of graphite and $Al_2O_3$ particles thus obtained was added with 2 weight-% of vegetable oil, and the composition was mixed until an even distribution of the Al₂O₃ particles on the graphite particles had been obtained. The mixture of graphite particles, Al₂O₃ particles and vegetable oil, and the mixture of iron fibres, iron particles and bronze powder were mixed in a V-mixer, internal rotor not being used for the first 5 min, and internal rotor being used for the succeeding 2 min.

The mixture thus obtained was pressed into briquettes having the dimensions 4×9×2 in a single-axis press and at a pressure of 300 MPa.

The green compacts obtained were then sintered in an oven in an atmosphere of $H_2$ and $N_2$. The compacts were first sintered at 700° C. for 0.5 h, and then at 1100° C. for 0.75 h. Finally, the sintered compacts were cooled to room temperature in an atmosphere of $H_2$ and $N_2$ for a period of time of 0.75 h.

The sintered compacts thus obtained were mounted on a steel plate, and the product thus obtained could hereafter be used for brake linings.

What is claimed is:

1. A friction material comprising a sintered mass of iron in which graphite particles are dispersed, the sintered mass comprising from between 13 and 22 vol. % of iron fibres, between 13 and 22 vol. % of iron particles having a particle size from 10 to 400 μm, between 40 and 70 vol. % of graphite particles having a particle size from 25 to 3000 μm, and between 10 and 15 vol. % of a metallic binder having a melting point from 800 to 1140° C.

2. A friction material according to claim 1, wherein the iron fibres are steel fibres.

3. A friction material according to claim 1, wherein the iron fibres have a length from 0.5 to 5 mm and a thickness from 10 to 100 μm.

4. A friction material according to claim 1, wherein the iron particles have a particle size from 20 to 200 μm.

5. A friction material according to claim 1, wherein the graphite particles have a particle size from 90 to 1000 μm.

6. A friction material according to claim 1, wherein the metallic binder is selected from a group consisting of Cu, Sn and Zn.

7. A friction material according to claim 6, wherein the metallic binder is bronze containing from 85 to 99% of copper and from 1 to 15% of tin.

8. A friction material according to claim 1. wherein the sintered mass is formed from a mixture which additionally contains from 0.1 to 15 vol. % of additional components.

9. A friction material according to claim 8, wherein the additional component(s) is/are selected from a group consisting of Al₂O₃, FeSi, Fe₃Si₂, FeSi₂, Fe₂Si₅, MgCO₃, SiO₂, BN, Ca₃(PO₄)₂, BaSO₄, Fe₂O₃, CuAl₂, Si, Al, Cu, P, and sulphides of Mo, Mn, Sb, Cu, Sn and W.

10. A friction material according to claim 8, wherein the additional component(s) is/are a ceramic material.

11. A friction material according to claim 10, wherein the ceramic material is present in the sintered mass in two different grain sizes.

12. A method of preparing a friction material in the form of a sintered mass of iron in which graphite particles are dispersed, comprising the steps of compressing a mixture comprising 13–22 vol. % of iron fibres, 13–22 vol. % of iron particles having a particle size between 10 and 400 μm, 40–70 vol. % of graphite particles having a particle size between 25 and 3000 μm, and 10–15 vol. % of metallic binder at a pressure of at least 100 MPa so as to form a compact having a desired form and size, and sintering the compact thus formed at a temperature between 800 and 1140° C. for a sufficiently long period of time to achieve concretion of iron fibres, iron particles and metallic binder.

13. A method according to claim 12, wherein iron fibres, iron particles and metallic binder are mixed prior to these components being mixed with the graphite particles.

14. A method according to claim 13, wherein the graphite particles are used in mixture with Al₂O₃ particles.

15. A method according to claim 14, wherein the mixture of graphite particles and Al₂O₃ particles is prepared by dispersing Al₂O₃ particles in water, mixing the dispersion thus formed with graphite particles, and removing the water by evaporation.

16. A method according to claim 14, wherein the mixture of graphite particles and Al₂O₃ particles additionally contains oil in an amount of 1–3 weight %.

17. A brake lining which includes a friction material according to claim 1.

* * * * *